US012080161B2

(12) United States Patent
Lee et al.

(10) Patent No.: US 12,080,161 B2
(45) Date of Patent: Sep. 3, 2024

(54) TRAFFIC SIGNAL UNDERSTANDINGS AND REPRESENTATION FOR PREDICTION, PLANNING, AND CONTROL

(71) Applicant: TOYOTA RESEARCH INSTITUTE, INC., Los Altos, CA (US)

(72) Inventors: Kuan-Hui Lee, San Francisco, CA (US); Charles Christopher Ochoa, San Francisco, CA (US); Arjun Bhargava, San Francisco, CA (US); Chao Fang, Sunnyvale, CA (US); Kun-Hsin Chen, San Francisco, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 107 days.

(21) Appl. No.: 17/732,376

(22) Filed: Apr. 28, 2022

(65) Prior Publication Data

US 2023/0351886 A1 Nov. 2, 2023

(51) Int. Cl.
*G08G 1/01* (2006.01)

(52) U.S. Cl.
CPC ......... *G08G 1/0125* (2013.01); *G08G 1/0141* (2013.01)

(58) Field of Classification Search
CPC ........................... G08G 1/0125; G08G 1/0141
See application file for complete search history.

(56) References Cited

U.S. PATENT DOCUMENTS

| | | | |
|---|---|---|---|
| 2014/0058579 A1 | 2/2014 | Ono | |
| 2015/0210278 A1 | 7/2015 | Ben Shalom et al. | |
| 2019/0333373 A1 | 10/2019 | Fang et al. | |
| 2019/0333381 A1* | 10/2019 | Shalev-Shwartz | G01C 21/3602 |
| 2020/0134333 A1 | 4/2020 | Vishal et al. | |
| 2020/0151468 A1 | 5/2020 | Hermalyn et al. | |
| 2021/0211568 A1 | 7/2021 | Zhou et al. | |
| 2021/0276595 A1* | 9/2021 | Casas | B60W 60/0027 |
| 2021/0302975 A1* | 9/2021 | McGill, Jr. | G05D 1/0214 |
| 2021/0357763 A1 | 11/2021 | Je et al. | |

OTHER PUBLICATIONS

Yang, et al., "A hierarchical behavior prediction framework at signalized intersections," 2021 IEEE International Intelligent Transportation Systems Conference (ITSC), 2021, pp. 515-521.
Gaspard, et al. "Optimal Driving Under Traffic Signal Uncertainty", arXiv:2201.04521 [math.OC], Jan. 12, 2022.

* cited by examiner

*Primary Examiner* — Curtis A Kuntz
*Assistant Examiner* — James E Munion
(74) *Attorney, Agent, or Firm* — SEYFARTH SHAW LLP

(57) ABSTRACT

A method for vehicle prediction, planning, and control is described. The method includes separately encoding traffic state information at an intersection into corresponding traffic state latent spaces. The method also includes aggregating the corresponding traffic state latent spaces to form a generalized traffic geometry latent space. The method further includes interpreting the generalized traffic geometry latent space to form a traffic flow map including current and future vehicle trajectories. The method also includes decoding the generalized traffic geometry latent space to predict a vehicle behavior according to the traffic flow map based on the current and future vehicle trajectories.

20 Claims, 7 Drawing Sheets

500

OOO

BOO

OLO

BLO

OOR

BOR

OLR

BLR

TRAFFIC SIGNAL UNDERSTANDINGS AND REPRESENTATION FOR PREDICTION, PLANNING, AND CONTROL

BACKGROUND

Field

Certain aspects of the present disclosure generally relate to machine learning and, more particularly, traffic signal understandings and representation for prediction, planning, and control.

Background

Autonomous agents (e.g., vehicles, robots, etc.) rely on machine vision for sensing a surrounding environment by analyzing areas of interest in a scene from images of the surrounding environment. Although scientists have spent decades studying the human visual system, a solution for realizing equivalent machine vision remains elusive. Realizing equivalent machine vision is a goal for enabling truly autonomous agents. Machine vision, however, is distinct from the field of digital image processing. In particular, machine vision involves recovering a three-dimensional (3D) structure of the world from images and using the 3D structure for fully understanding a scene. That is, machine vision strives to provide a high-level understanding of a surrounding environment, as performed by the human visual system.

Autonomous agents, such as driverless cars and robots, are quickly evolving and have become a reality in this decade. Because autonomous agents have to interact with humans, however, many critical concerns arise. For example, how to design vehicle control of an autonomous vehicle using machine learning. Unfortunately, vehicle control by machine learning is less effective in complicated traffic environments involving complex interactions between vehicles (e.g., a situation where a controlled (ego) vehicle merges/changes onto/into a traffic lane).

Machine learning techniques for vehicle control using a network to select a vehicle control action of the ego vehicle is dependent on predicted actions of other vehicles and pedestrians, especially at intersections. A capability for determining the likelihood that a vehicle performs a predicted action at an intersection is desired.

SUMMARY

A method for vehicle prediction, planning, and control is described. The method includes separately encoding traffic state information at an intersection into corresponding traffic state latent spaces. The method also includes aggregating the corresponding traffic state latent spaces to form a generalized traffic geometry latent space. The method further includes interpreting the generalized traffic geometry latent space to form a traffic flow map including current and future vehicle trajectories. The method also includes decoding the generalized traffic geometry latent space to predict a vehicle behavior according to the traffic flow map based on the current and future vehicle trajectories.

A non-transitory computer-readable medium having program code recorded thereon for vehicle prediction, planning, and control is described. The program code is executed by a processor. The non-transitory computer-readable medium includes program code to separately encode traffic state information at an intersection into corresponding traffic state latent spaces. The non-transitory computer-readable medium also includes program code to aggregate the corresponding traffic state latent spaces to form a generalized traffic geometry latent space. The non-transitory computer-readable medium further includes program code to interpret the generalized traffic geometry latent space to form a traffic flow map including current and future vehicle trajectories. The non-transitory computer-readable medium also includes program code to decode the generalized traffic geometry latent space to predict a vehicle behavior according to the traffic flow map based on the current and future vehicle trajectories.

A system for vehicle prediction, planning, and control is described. The system includes a traffic state latent space model to separately encode traffic state information at an intersection into corresponding traffic state latent spaces. The system also includes a traffic geometry latent space model to aggregate the corresponding traffic state latent spaces to form a generalized traffic geometry latent space. The system further includes a semantic traffic flow generation model to interpret the generalized traffic geometry latent space to form a traffic flow map including current and future vehicle trajectories. The system also includes a vehicle behavior prediction model to decode the generalized traffic geometry latent space to predict a vehicle behavior according to the traffic flow map based on the current and future vehicle trajectories.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
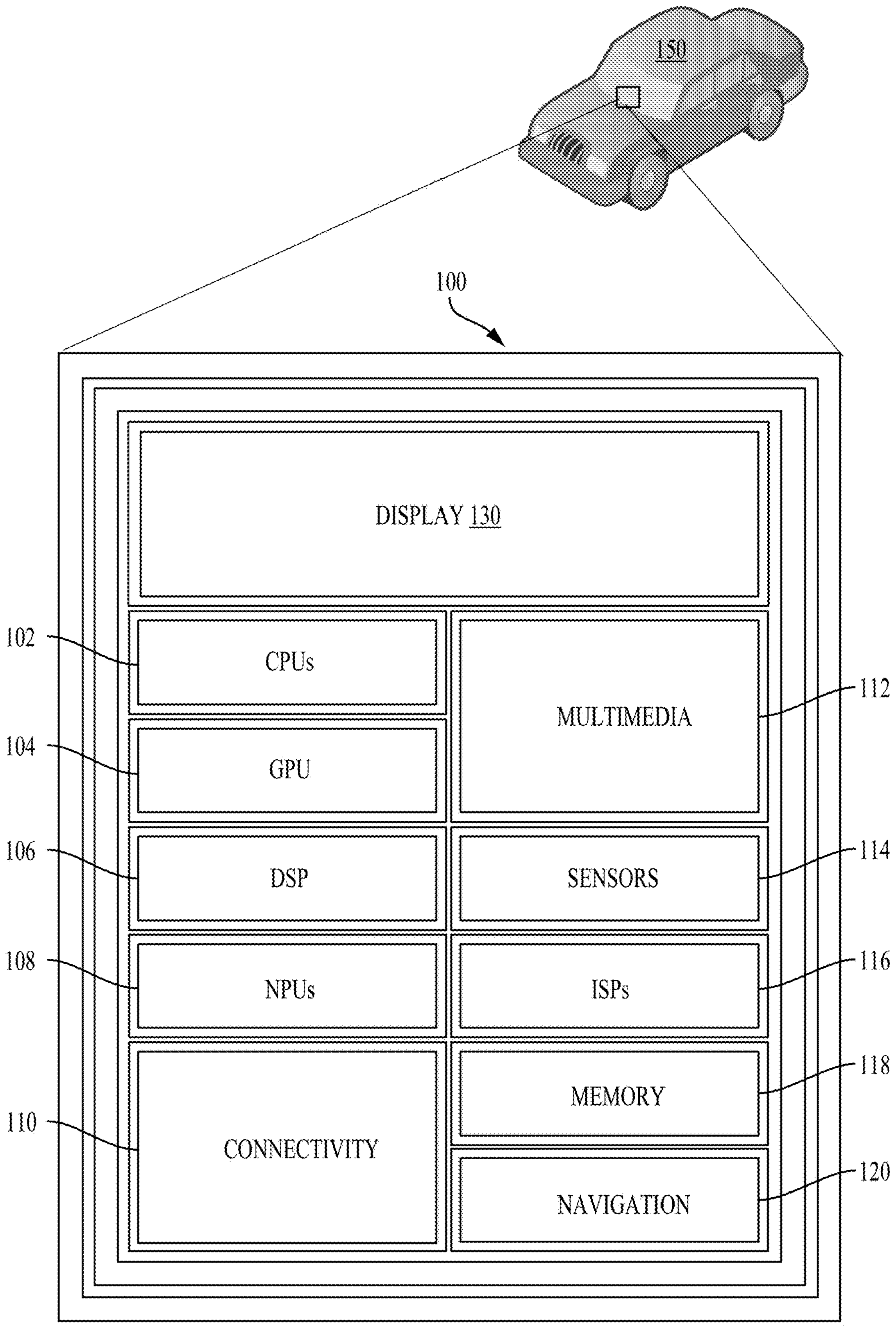
FIG. 1 illustrates an example implementation of designing a system using a system-on-a-chip (SOC) for traffic signal understandings and representation for prediction, planning, and control, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Vehicle planning by machine learning is less effective in complicated traffic environments. For example, these traffic environments may involve complex interactions between vehicles, including situations where an ego vehicle maneuvers into and out of traffic lanes (e.g., intersections). Traffic signals, such as traffic lights and traffic signs (stop signs, yield signs, etc.) provide information and/or restrictions to a driver and/or an autonomous vehicle system for operating the vehicle. As such, when approaching an intersection with a four-way stop, vehicles that are stopped at that intersection would expect other vehicles approaching that intersection to also stop.

In addition, machine learning for ego vehicle planning and control often involves large labeled datasets to reach state-of-the-art performance. For example, learning-based traffic light (TL) detectors are shown as superior in their robustness in localizing and classifying traffic lights under different lighting conditions, weather, camera settings, and the like. Unfortunately, like all other learning-based computer-vision models, the conventional supervised training methods still rely heavily on large-scale annotated datasets. It is recognized that the performance of a learning-based model improves as the volume of data on which it is trained increases. Unfortunately, collecting, curating, and annotating a traffic light dataset is quite expensive. Also, human annotation is expensive.

Conventional machine learning techniques for planning vehicle control may use a network to plan an appropriate vehicle control action from input data relative to the ego vehicle. For example, a selected speed/acceleration/steering angle of an ego vehicle may be planned as a vehicle control action to perform a vehicle control maneuver. Unfortunately, conventional machine learning techniques may be problematic when the ego vehicle encounters a complex intersection. For example, when an autonomous vehicle (AV) is driving on a roadway, conventional approaches plan actions based on determinations made by a vehicle perception system. The vehicle perception system can include a number of different sensors, such as cameras, a light detection and ranging (LIDAR) sensor or a radio detection and ranging (RADAR) sensor, sonar, or other like sensor. Conventional approaches of planning actions at complex intersections may also involve expensive maps in addition to the complex LIDAR and RADAR sensors.

Aspects of the present disclosure are directed to using traffic signal predictions as a prior to learn an interpretable representation for vehicle behavior prediction. In some aspects of the present disclosure, a first neural network receives a traffic signal prediction from a second neural network as an input. Using this traffic signal prediction as a prior, the first neural network learns the expected behaviors of other vehicles. In one aspect of the present disclosure, the traffic signal prediction is the prediction of one or more traffic signals located near an ego vehicle characterizing and predicting what one or more traffic signals will output in the future. Using the concept that vehicles usually follow traffic signals, the first neural network is trained to predict how other vehicles should act using the traffic signal prediction as an input. In some aspects of the present disclosure, assuming the traffic signal predictions are correct, the first neural network learns how other vehicles approaching traffic signals at an intersection operate in response to these traffic signals.

Some aspects of the present disclosure are directed to traffic signal understandings and representation for autonomous dynamic object (ADO) prediction and ego vehicle planning and control. In one aspect of the present disclosure, a set of vision inputs are processed into a generalized traffic geometry latent space. In this aspect of the present disclosure, a network accepts multiple different vision inputs, including traffic signal states, turn light and/or brake light states of ADOs, and ego vehicle states. These values are processed into independent latent spaces before being consumed by an interpretative network that feeds the combined embeddings into a recurrent neural network (RNN) for processing into the interpretable traffic latent space. Further processing is subsequently performed using a subsequent RNN to decode the embeddings into various predictions including trajectory forecasting, and so on. Advantageously, the noted process is implemented without relying on map data or expensive LIDAR/RADAR sensors.

FIG. 1 illustrates an example implementation of the aforementioned system and method for traffic signal understandings and representation for prediction, planning, and control using a system-on-a-chip (SOC) 100 of an ego vehicle 150. The SOC 100 may include a single processor or multi-core processors (e.g., a central processing unit (CPU)), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The system-on-a-chip (SOC) 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system (GPS).

The system-on-a-chip (SOC) 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for traffic signal understandings and representation for prediction, planning, and control within an image captured by the sensor processor 114. The instructions loaded into a processor (e.g., CPU 102) may also include code for planning and control (e.g., of the ego vehicle 150) in response to the traffic signal understandings and representation from images captured by the sensor processor 114.

The instructions loaded into the NPU 108 may include code to separately encode traffic state information at an intersection into corresponding traffic state latent spaces. The instructions loaded into the NPU 108 may also include code to aggregate the corresponding traffic state latent spaces to form a generalized traffic geometry latent space. The instructions loaded into the NPU 108 may further include code to interpret the generalized traffic geometry latent space to form a semantic traffic flow map including current and future trajectories of surrounding autonomous dynamic objects (ADOs). The instructions loaded into the NPU 108 may also include code to plan a trajectory of an ego vehicle according to the semantic traffic flow map based on the future trajectories of the ADOs.

Figure 2:
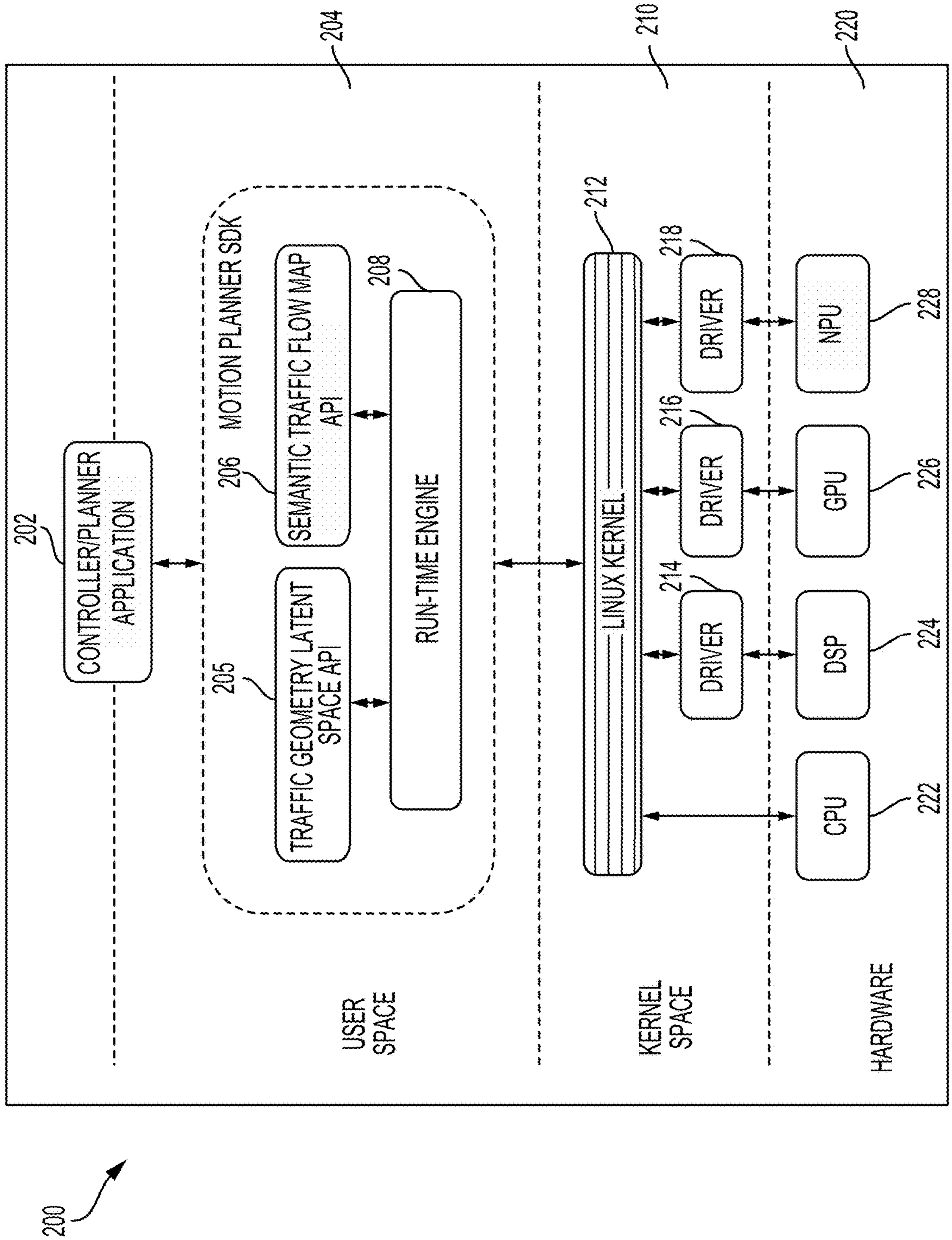
FIG. 2 is a block diagram illustrating a software architecture that may modularize functions for traffic signal understandings and representation for prediction, planning, and control, according to aspects of the present disclosure.

FIG. 2 is a block diagram illustrating a software architecture 200 that may modularize functions for planning and control of an ego vehicle using traffic signal understandings and representation, according to aspects of the present disclosure. Using the architecture, a controller/planner application 202 may be designed such that it may cause various processing blocks of a system-on-a-chip (SOC) 220 (for example a CPU 222, a DSP 224, a GPU 226, and/or an NPU 228) to perform supporting computations during run-time operation of the controller/planner application 202.

The controller/planner application 202 may be configured to call functions defined in a user space 204 that may, for example, perform traffic signal understanding and representation from a scene in a video captured by a monocular camera of an ego vehicle. In aspects of the present disclosure, the representation provides a semantic traffic flow map including current and future trajectories of surrounding autonomous dynamic objects (ADOs) of the ego vehicle. The controller/planner application 202 may make a request to compile program code associated with a library defined in a traffic geometry latent space application programming interface (API) 205 to aggregate corresponding traffic state latent spaces to form a generalized traffic geometry latent space. The generalized traffic geometry latent space enables formation of the semantic traffic flow map using a semantic traffic flow map API 206. In some aspects of the present disclosure, the controller/planner application 202 uses future trajectories of surrounding ADOs from an ego vehicle illustrated by a semantic traffic flow map to plan a trajectory of the ego vehicle.

A run-time engine 208, which may be compiled code of a run-time framework, may be further accessible to the controller/planner application 202. The controller/planner application 202 may cause the run-time engine 208, for example, to separately encode traffic state information at an intersection into corresponding traffic state latent spaces. When an ADO is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network (DNN) may be configured to run on a combination of processing blocks, such as the CPU 222 and the GPU 226, or may be run on the NPU 228, if present.

Figure 3:
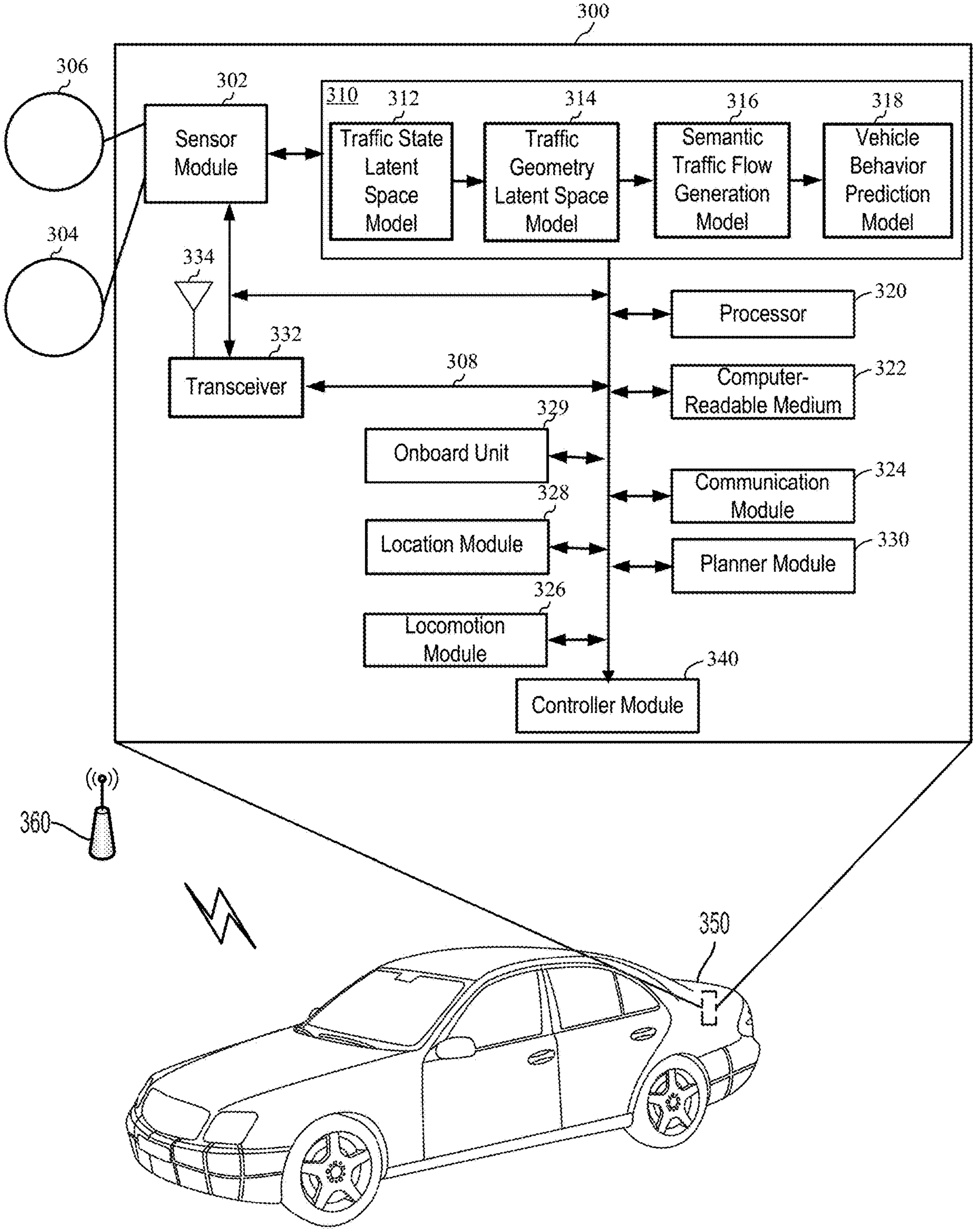
FIG. 3 is a diagram illustrating an example of a hardware implementation for a vehicle prediction, planning, and control system, according to aspects of the present disclosure.

FIG. 3 is a diagram illustrating an example of a hardware implementation for a vehicle prediction, planning, and control system 300, according to aspects of the present disclosure. The vehicle prediction, planning, and control system 300 may be configured for using traffic signal understandings and representation from a scene to enable planning and controlling of an ego vehicle in response to images from video captured through a camera during operation of a car 350. The vehicle prediction, planning, and control system 300 is configured to process a set of vision inputs into a generalized traffic geometry latent space. In these aspects of the present disclosure, a neural network of the vehicle prediction, planning, and control system 300 accepts multiple different vision inputs, including traffic signal states at an intersection, turn light and/or brake light states of autonomous dynamic objects (ADOs), and ego vehicle states. These values are processed into independent latent spaces before being consumed by an interpretative network that feeds the combined embeddings into a recurrent neural network (RNN) for processing into the interpretable traffic latent space. Further processing is subsequently performed using a subsequent RNN to decode the embeddings into various predictions including trajectory forecasting, and so on. Advantageously, the noted process is implemented without relying on map data or expensive LIDAR/RADAR sensors.

The vehicle prediction, planning, and control system 300 may be a component of a vehicle, a robotic device, or other device. For example, as shown in FIG. 3, the vehicle prediction, planning, and control system 300 is a component of the car 350. Aspects of the present disclosure are not limited to the vehicle prediction, planning, and control system 300 being a component of the car 350, as other devices, such as a bus, motorcycle, or other like vehicle, are also contemplated for using the vehicle prediction, planning, and control system 300. The car 350 may be autonomous or semi-autonomous.

The vehicle prediction, planning, and control system 300 may be implemented with an interconnected architecture, represented generally by an interconnect 308. The interconnect 308 may include any number of point-to-point interconnects, buses, and/or bridges depending on the specific application of the vehicle prediction, planning, and control system 300 and the overall design constraints of the car 350. The interconnect 308 links together various circuits, including one or more processors and/or hardware modules, represented by a sensor module 302, a vehicle perception module 310, a processor 320, a computer-readable medium 322, a communication module 324, a locomotion module 326, a location module 328, an onboard unit 329, a planner module 330, and a controller module 340. The interconnect 308 may also link various other circuits, such as timing sources, peripherals, voltage regulators, and power management circuits, which are well known in the art, and therefore, will not be described any further.

The vehicle prediction, planning, and control system 300 includes a transceiver 332 coupled to the sensor module 302, the vehicle perception module 310, the processor 320, the computer-readable medium 322, the communication module 324, the locomotion module 326, the location module 328, the onboard unit 329, the planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit a semantic traffic flow map of an intersection from video captured by the car 350 and/or planned actions from the vehicle perception module 310 to a server (not shown).

The vehicle prediction, planning, and control system 300 includes the processor 320 coupled to the computer-readable medium 322. The processor 320 performs processing, including the execution of software stored on the computer-readable medium 322, to provide functionality, according to the present disclosure. The software, when executed by the processor 320, causes the vehicle prediction, planning, and control system 300 to perform the various functions described for ego vehicle generation of a semantic traffic flow map of an intersection from video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing two-dimensional (2D) RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the vehicle perception module 310, the communication module 324, the locomotion module 326, the location module 328, and the controller module 340. In conjunction with the computer-readable medium 322, the images from the first sensor 304 and/or the second sensor 306 are processed to implement the described functionality. In one configuration, detected traffic state information captured by the first sensor 304 and/or the second sensor 306 may be transmitted via the transceiver 332. The first sensor 304 and the second sensor 306 may be coupled to the car 350 or may be in communication with the car 350.

Vehicle planning by machine learning is less effective in complicated traffic environments. For example, these traffic environments may involve complex interactions between vehicles, including situations where an ego vehicle maneuvers into and out of traffic lanes (e.g., intersections). Traffic signals, such as traffic lights and traffic signs (stop signs, yield signs, etc.) provide information and/or restrictions to a driver and/or an autonomous vehicle system for operating the vehicle. As such, when approaching an intersection with a four-way stop, vehicles that are stopped at that intersection would expect other vehicles approaching that intersection to also stop.

Understanding an intersection from a video input based on a semantic traffic flow map of the intersection is an important perception task in the area of autonomous driving, such as the car 350. A vehicle perception system may include a number of different sensors, such as light detection and ranging (LIDAR) sensors, radio detection and ranging (RADAR) sensors, sonar, or other like sensors for perceiving the highway intersection. Conventional approaches of planning actions at complex intersections may also involve expensive maps in addition to the complex LIDAR and RADAR sensors. That is, these conventional techniques are unable to perform traffic state detection solely from two-dimensional (2D) camera video image frames.

In some aspects of the present disclosure, the vehicle prediction, planning, and control system 300 is directed to using traffic signal predictions as a prior to learn a representation for vehicle behavior prediction. In some aspects of the present disclosure, a first neural network receives a traffic signal prediction from a second neural network as an input. Using this traffic signal prediction as a prior, the first neural network learns the expected behaviors of other vehicles. In one aspect of the present disclosure, the traffic signal prediction is the prediction of one or more traffic signals located near an ego vehicle characterizing and predicting what one or more traffic signals will output in the future. Using the concept that vehicles usually follow traffic signals, the first neural network is trained to predict how other vehicles should act using the traffic signal prediction as an input. In some aspects of the present disclosure, assuming the traffic signal predictions are correct, the first neural network learns how other vehicles approaching traffic signals at an intersection operate in response to these traffic signals to enable semantic traffic flow map generation.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A dedicated short-range communication (DSRC)-compliant global positioning system (GPS) unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), third generation (3G), etc. The communication module 324 may also communicate with other components of the car 350 that are not modules of the vehicle prediction, planning, and control system 300. The transceiver 332 may be a communications channel through a network access point 360. The communications channel may include dedicated short-range communication (DSRC), LTE, LTE-device-to-device (D2D) (LTE-D2D), mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, dedicated short-range communication (DSRC), full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), long term evolution (LTE), LTE-vehicle-to-everything (V2X) (LTE-V2X), LTE-device-to-device (D2D) (LTE-D2D), voice over long term evolution (VoLTE), or any other mobile data network or combination of mobile data networks. Further, the network access point 360 may include one or more Institute of Electrical and Electronics Engineers (IEEE) 802.11 wireless networks.

The vehicle prediction, planning, and control system 300 also includes the planner module 330 for planning a selected trajectory to perform a route/action (e.g., collision avoidance) of the car 350, and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The vehicle perception module 310 may be in communication with the sensor module 302, the processor 320, the computer-readable medium 322, the communication module 324, the locomotion module 326, the location module 328, the onboard unit 329, the planner module 330, the transceiver 332, and the controller module 340. In one configuration, the vehicle perception module 310 receives video only inputs from the sensor module 302. The sensor module 302 may receive the video only inputs from the first sensor 304 and the second sensor 306. According to aspects of the present disclosure, the vehicle perception module 310 may receive the video only inputs directly from the first sensor 304 or the second sensor 306 to perform traffic signal understandings and representation from a scene to enable planning and controlling of the car in response to video only input captured through a camera during operation of the car 350.

As shown in FIG. 3, the vehicle perception module 310 includes a traffic state latent space model 312, a traffic geometry latent space model 314, a semantic traffic flow generation model 316, and a vehicle behavior prediction model 318. The traffic state latent space model 312, the traffic geometry latent space model 314, the semantic traffic flow generation model 316, and the vehicle behavior prediction model 318 may be components of a same or different artificial neural network, such as a deep neural network (DNN). The traffic geometry latent space model 314, the semantic traffic flow generation model 316, and the vehicle behavior prediction model 318 are not limited to a DNN. In operation, the vehicle perception module 310 receives the video only inputs directly from the first sensor 304 or the second sensor 306. The video only input may include multiple frames, such as video frames. In this configuration, the first sensor 304 captures monocular (single camera) 2D RGB images.

The vehicle perception module 310 may be configured for using traffic signal understandings and representation from a scene to enable planning and controlling of the car in response to images from video captured through a camera during operation of the car 350. The traffic state latent space model 312 is trained to process a set of vision inputs into a generalized traffic geometry latent space. In these aspects of the present disclosure, the traffic state latent space model 312 accepts multiple different vision inputs, including traffic signal states at an intersection, turn light and/or brake light states of autonomous dynamic objects (ADOs) near the intersection, and ego vehicle states of the car 350. These values are processed by the traffic state latent space model 312 into independent latent spaces before being consumed by the traffic geometry latent space model 314.

In some aspects of the present disclosure, the traffic geometry latent space model 314 is implemented as an interpretative network. In these aspects of the present disclosure, the traffic geometry latent space model 314 is trained to aggregate the corresponding traffic state latent spaces from the traffic state latent space model 312 to form a generalized traffic geometry latent space. In some aspects of the present disclosure, the traffic geometry latent space model 314 feeds the combined embeddings of the generalized traffic geometry latent space into the semantic traffic flow generation model 316.

In some aspects of the present disclosure, the semantic traffic flow generation model 316 is implemented as a recurrent neural network (RNN) for processing the generalized traffic geometry latent space into the interpretable traffic latent space, such as a semantic traffic flow map. The semantic traffic flow map may include current and future trajectories of surrounding autonomous dynamic objects (ADOs). The semantic traffic flow map may enable planning of a trajectory of the car 350 according to the future trajectories of the ADOs illustrated by the semantic traffic flow map. The vehicle behavior prediction model 318 may be implemented as an RNN for performing subsequent processing to decode the embeddings of the interpretable traffic latent space into various predictions including trajectory forecasting, and the like. Advantageously, the noted process is implemented without relying on map data or expensive LIDAR/RADAR sensors, for example, as shown in FIG. 4.

Figure 4:
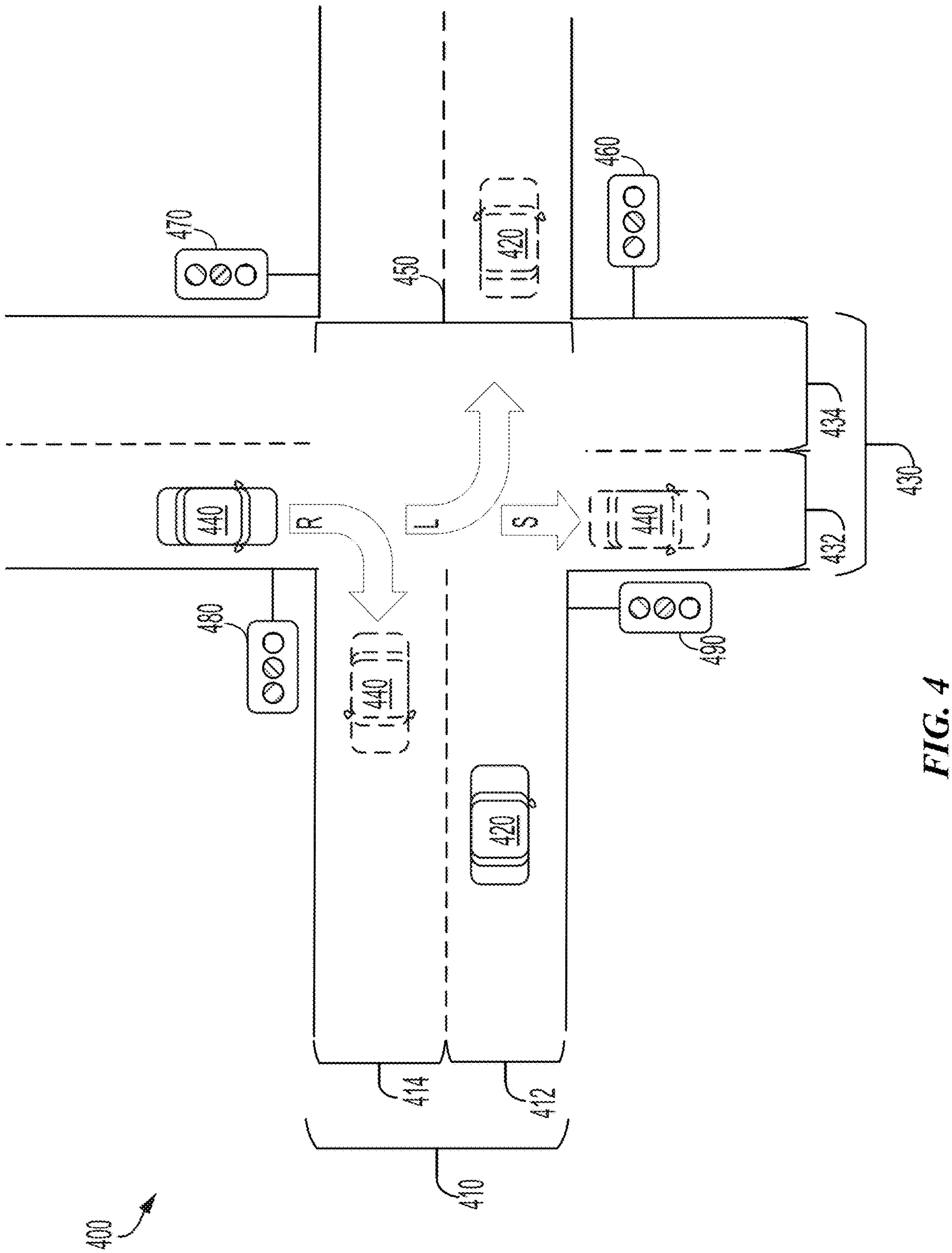
FIG. 4 is a diagram illustrating an overview of a roadway environment, including an ego vehicle in the first lane of the roadway and a detected vehicle approaching an intersection, according to aspects of the present disclosure.

FIG. 4 is a diagram illustrating an overview of a roadway environment, including an ego vehicle in the first lane of the roadway and a detected vehicle approaching an intersection, according to aspects of the present disclosure. Traffic signals, such as traffic lights and traffic signs (stop signs, yield signs, etc.) provide information and/or restrictions to a driver and/or an autonomous vehicle system for operating the vehicle. As such, when approaching an intersection with a four-way stop, vehicles that are stopped at that intersection would expect other vehicles approaching that intersection to also stop. Predicting the vehicle behavior becomes more complex when the four-way stop is replaced with traffic signals due to the signal state prediction.

In the example of FIG. 4, a roadway environment 400 includes a first roadway 410, having a first lane 412 in which an ego vehicle 420 is traveling and a second lane 414. The first roadway 410 is controlled by traffic signals 460 and 480. In addition, the roadway environment 400 includes a second roadway 430, having a first lane 432 in which a detected vehicle 440 is traveling and a second lane 434. The second roadway 430 is controlled by traffic signals 470 and 490. In this example, the detected vehicle 440 approaching the intersection 450 from the second roadway 430 has three choices. The detected vehicle 440 can go straight on the second roadway 430, or turn left or right onto the first roadway 410. The lane that the detected vehicle 440 travels to after crossing the intersection 450 is referred to as the "exit lane." Detecting the exit lane used by the detected vehicle 440 may be anticipated based on vehicle taillight states, as shown in FIGS. 5A-5H.

Figure 5A:
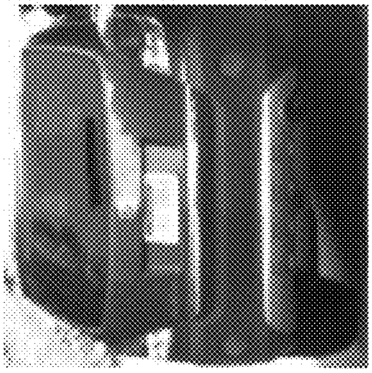
FIGS. 5A to 5H are images illustrating vehicle taillight states, according to aspects of the present disclosure.
Figure 5B:
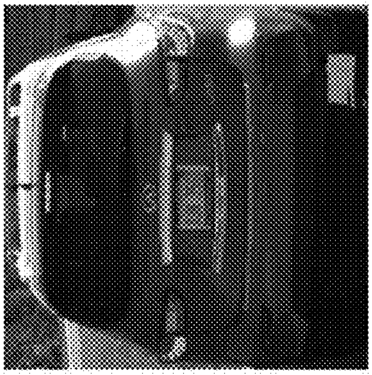
Figure 5C:
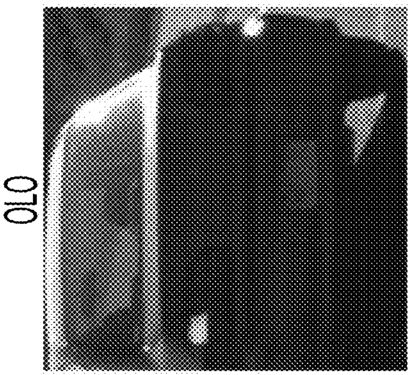
Figure 5D:
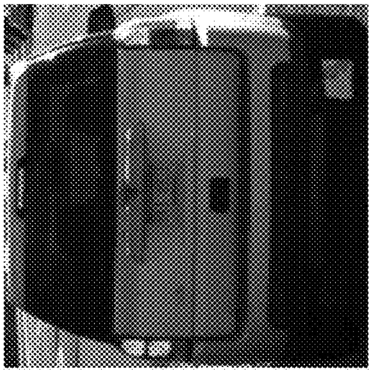
Figure 5E:
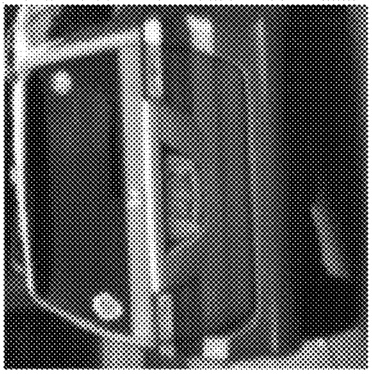
Figure 5F:
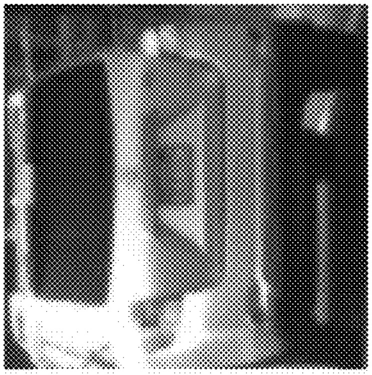
Figure 5G:
Figure 5H:
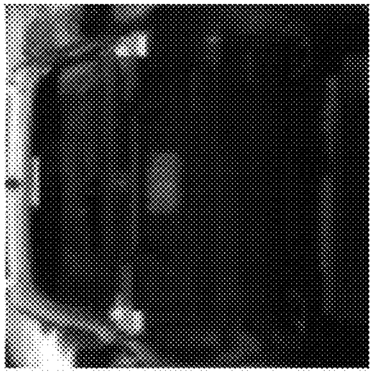

FIGS. 5A to 5H are images illustrating vehicle taillight states, according to aspects of the present disclosure. In this example, eight different taillight states are based on all combinations of brake and turn lights. As shown in FIGS. 5A to 5H, each state is denoted by three letters of "B" (brake), "L" (left), and "R" (right), in which either the corresponding letter is displayed when on, or a letter "O" (off) is displayed when the corresponding signal is off. For example, in FIG. 5A all taillights are off (OOO). In FIG. 5B only the brake light is on (BOO); in FIG. 5C only the left turn light is on (OLO); in FIG. 5D both the brake light and the left turn light are on (BLO); in FIG. 5E only the right turn light is on (OOR); in FIG. 5F both the brake light and the right turn light are on (BOR); in FIG. 5G both the left turn light and the right turn light are on (OLR); and in FIG. 5H all the taillights are on (BLR).

Figure 6:
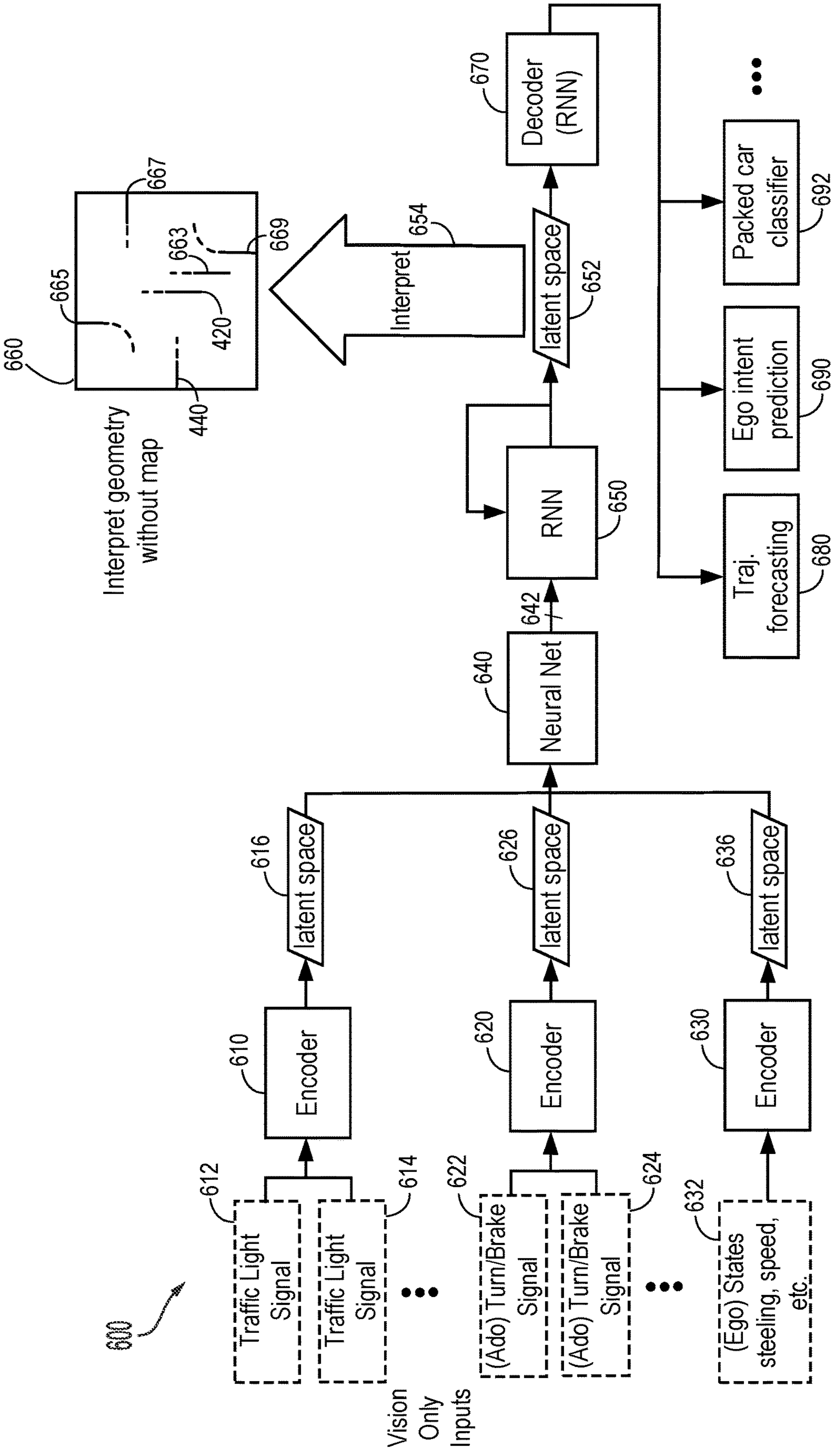
FIG. 6 is a block diagram of a vehicle prediction, planning, and control system, in accordance with an illustrative configuration of the present disclosure.

FIG. 6 is a block diagram of a vehicle prediction, planning, and control system 600, in accordance with an illustrative configuration of the present disclosure. The vehicle prediction, planning, and control system 600 is described with reference to the roadway environment 400 of FIG. 4 and the vehicle taillight states shown in FIG. 5A-5H. As shown in FIG. 6, the vehicle prediction, planning, and control system 600 includes a traffic signal encoder 610, a turn/brake signal encoder 620, and an ego state encoder 630. In this example, the traffic signal encoder 610 and the turn/brake signal encoder 620 receive video only inputs, including traffic light signals 612, 614, and turn/brake light signals 622, 624 of surrounding autonomous dynamic objects (ADOs) captured using a camera of the ego vehicle 420. This configuration of the vehicle prediction, planning, and control system 600 is a simplified configuration that does not rely on complex LIDAR/RADAR sensors to capture a scene surrounding the ego vehicle 420.

In some aspects of the present disclosure, the traffic signal encoder 610 processes the traffic light signals 612, 614 to generate a traffic light state latent space 616. As described, a latent space (e.g., a latent feature space or embedding space) refers to an embedding of a set of items within a manifold in which items that resemble each other more closely are positioned closer to one another in the latent space. For example, as shown in FIG. 4, the traffic light state latent space 616 may provide an embedding of a current state of the traffic signals 460, 470, 480, and 490 (e.g, RED, YELLOW, GREEN).

Similarly, the turn/brake signal encoder 620 processes the turn/brake light signals 622, 624 to generate a turn/brake light signal state latent space 626. For example, the turn/brake signal encoder 620 may provide an embedding of a current turn/brake light state of the turn/brake light signals 622, 624 (e.g., OOO, BOO, OLO, BLO, OOR, BOR, OLR, BLR). As shown in FIGS. 5A to 5H, each state is denoted by three letters of "B" (brake), "L" (left), and "R" (right), in which either the corresponding letter is displayed when on, or a letter "O" (off) is displayed when the corresponding signal is off. Referring again to FIG. 6, the ego state encoder 630 may provide an embedding of a current state of the ego vehicle 420 (e.g., steering, speed, etc.) within an ego state latent space 636.

In some aspects of the present disclosure, a neural network 640 aggregates the traffic light state latent space 616, the turn/brake light signal state latent space 626, and the ego state latent space 636 into an aggregated traffic latent space 642. In this example, aggregated traffic latent space 642 is processed by a recurrent neural network (RNN) 650 to form a generalized traffic geometry latent space 652. In this aspect of the present disclosure, the generalized traffic geometry latent space 652 is interpreted at block 654 to form a semantic traffic flow map 660. In this example, the semantic traffic flow map 660 includes current and future trajectories of the ego vehicle 420, detected vehicle 440, as well as surrounding ADOs (e.g., 663, 665, 667, 669).

In this configuration, the vehicle prediction, planning, and control system 600 includes an RNN 670 to decode the generalized traffic geometry latent space 652 to provide a representation for downstream prediction, planning, and control tasks. In this example, the downstream prediction, planning, and control tasks include a trajectory forecasting block 680, an EGO/ADO intent prediction block 690, and an ADO packed car classifier block 692, as well as other like downstream tasks.

In some aspects of the present disclosure, the vehicle prediction, planning, and control system 600 is trained using traffic signal predictions as a prior to learn a representation for vehicle behavior prediction. In some aspects of the present disclosure, the RNN 650 receives a traffic signal prediction from the neural network 640 as an input. Alternatively, the neural network 640 receives the traffic signal predictions as an input from the traffic signal encoder 610. Using this traffic signal prediction as a prior, the neural network 640 and/or the RNN 650 learn the expected behaviors of other vehicles to enable formation of the semantic traffic flow map 660, without relying on a high definition (HD) map.

The traffic signal prediction may be a prediction of the current state of the traffic signals 460, 470, 480, and 490 (e.g, RED, YELLOW, GREEN) near the ego vehicle 420, characterizing and predicting what the traffic signals 460, 470, 480, and 490 will output in the future. Using the concept that vehicles usually follow traffic signals, the neural network 640 and/or the RNN 650 are trained to predict how other vehicles should act using the traffic signal prediction as an input. In some aspects of the present disclosure, assuming the traffic signal predictions are correct, the neural network 640 and/or the RNN 650 learn how other vehicles approaching the traffic signals 460, 470, 480, and 490 at the intersection 450 operate in response to the traffic signals 460, 470, 480, and 490. This training enables the formation of the semantic traffic flow map 660, as further illustrated in FIG. 7.

Figure 7:
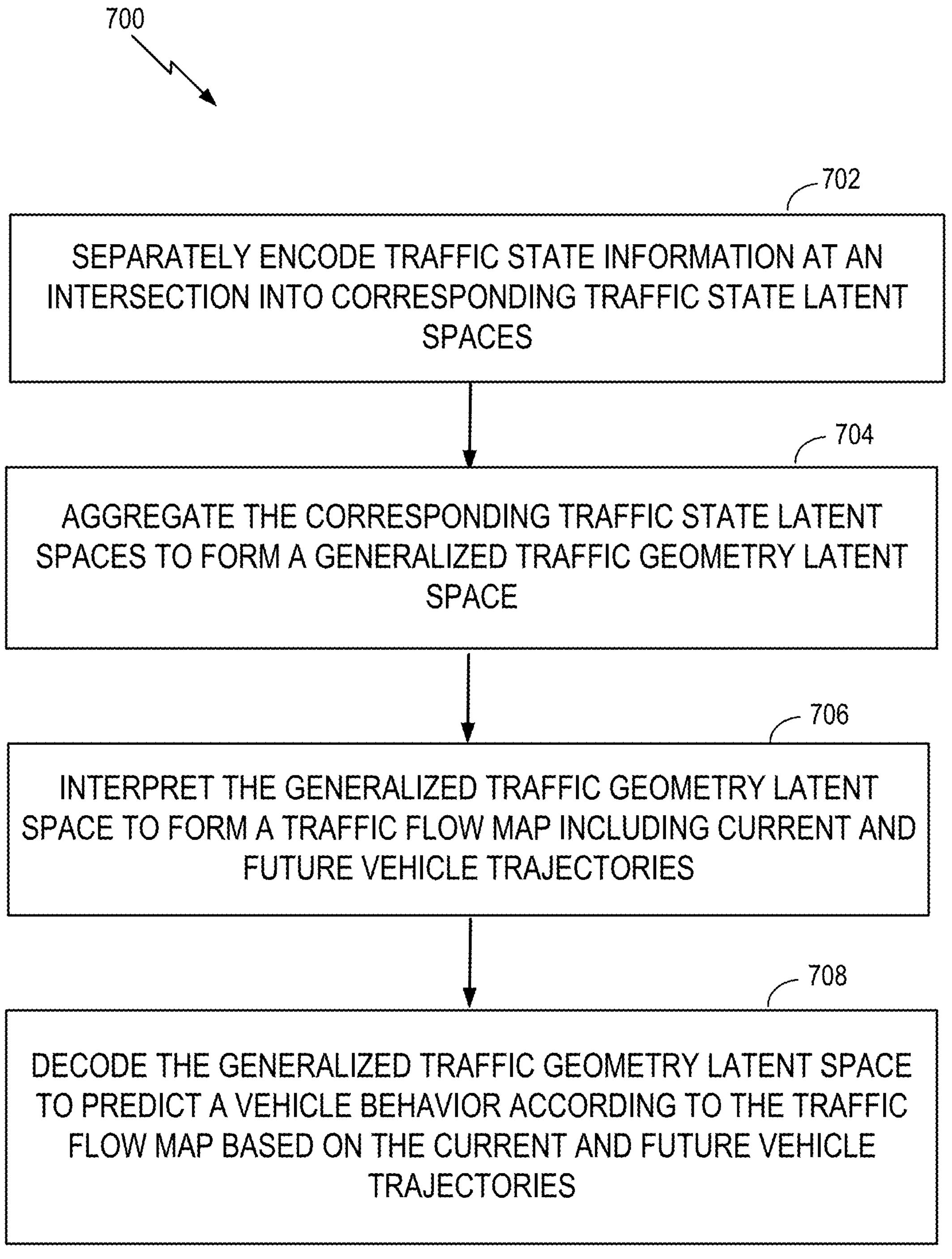
FIG. 7 is a flowchart illustrating a method for vehicle prediction, planning, and control, according to aspects of the present disclosure.

FIG. 7 is a flowchart illustrating a method for vehicle prediction, planning, and control, according to aspects of the present disclosure. The method 700 begins at block 702, in which traffic state information is separately encoded at an intersection into corresponding traffic state latent spaces. For example, as shown in FIGS. 4-6, the traffic signal encoder 610 and the turn/brake signal encoder 620 receive video only inputs, including traffic light signals 612, 614, and turn/brake light signals 622, 624 of surrounding autonomous dynamic objects (ADOs) captured using a camera of the ego vehicle 420. In this example, the traffic signal encoder 610 processes the traffic light signals 612, 614 to generate the traffic light state latent space 616. Similarly, the turn/brake signal encoder 620 processes the turn/brake light signals 622, 624 to generate a turn/brake light signal state latent space 626. In addition, the ego state encoder 630 may provide an embedding of a current state of the ego vehicle 420 (e.g., steering, speed, etc.) within the ego state latent space 636.

At block 704, the corresponding traffic state latent spaces are aggregated to form a generalized traffic geometry latent space. For example, as shown in FIG. 6, the neural network 640 aggregates the traffic light state latent space 616, the turn/brake light signal state latent space 626, and the ego state latent space 636 into an aggregated traffic latent space 642. In this example, aggregated traffic latent space 642 is processed by a recurrent neural network (RNN) 650 to form a generalized traffic geometry latent space 652.

At block 706, the generalized traffic geometry latent space is interpreted to form a traffic flow map including current and future vehicle trajectories. For example, as shown in FIG. 6, the generalized traffic geometry latent space 652 is interpreted at block 654 to form a semantic traffic flow map 660. In this example, the semantic traffic flow map 660 includes current and future trajectories of the ego vehicle 420, detected vehicle 440, as well as surrounding ADOs (e.g., 663, 665, 667, 669).

At block 708, the generalized traffic geometry latent space is decoded to predict a vehicle behavior according to the traffic flow map based on the current and future vehicle trajectories. For example, as shown in FIG. 6, the vehicle prediction, planning, and control system 600 includes an RNN 670 to decode the generalized traffic geometry latent space 652 to provide a representation for downstream prediction, planning, and control tasks. In this example, the downstream prediction, planning, and control tasks include a trajectory forecasting block 680, an EGO/ADO intent prediction block 690, and an ADO packed car classifier block 692, as well as other like downstream tasks.

The method 700 further includes encoding visual traffic signal state information at the intersection into a traffic signal state latent space of the corresponding traffic state latent spaces. The method 700 further includes encoding turn light and/or brake light state information of surrounding autonomous dynamic objects (ADOs) into a turn/brake light signal state latent space of the corresponding traffic state latent spaces. The method 700 further includes encoding traffic state information of an ego vehicle into an ego state latent space of the corresponding traffic state latent spaces. The method 700 further includes predicting a future traffic signal state according to a traffic light latent space of the corresponding traffic state latent spaces. The method 700 further includes predicting a vehicle state according to the future traffic signal state and a turn/brake light state latent space of the corresponding traffic state latent spaces, for example, as shown in FIGS. 4-6.

The method 700 further includes aggregating vision inputs of traffic light signals at the intersection during operation of an ego vehicle. The method 700 predicting a future state of the traffic light signals at the intersection during operation of the ego vehicle. The method 700 further includes processing turn/brake light signals of surrounding autonomous dynamic objects (ADOs) into a turn/brake light state latent space of the corresponding latent spaces. The method 700 further includes predicting ADO vehicle behavior at the intersection according to the future state of the traffic light signals and the turn/brake light state latent space. The method 700 further includes generating the traffic flow map according to an observed ADO vehicle behavior and the predicted ADO vehicle behavior at the intersection. The method 700 further includes decoding the generalized traffic geometry latent space. The method 700 further includes predicting an intention of a vehicle at the intersection. The method 700 further includes decoding the generalized traffic geometry latent space. The method 700 further includes forecasting a trajectory of a vehicle at the intersection, for example, as shown in FIGS. 4-6.

In some aspects of the present disclosure, the method 700 may be performed by the system-on-a-chip (SOC) 100 (FIG. 1) or the software architecture 200 (FIG. 2) of the ego vehicle 150 (FIG. 1). That is, each of the elements of method 700 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a compact disc-read-only memory (CD-ROM), and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits, such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, digital signal processors (DSPs), and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more programmable gate arrays (PGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into random access memory (RAM) from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise random access memory (RAM), read-only memory (ROM), electrically erasable programmable read-only memory (EEPROM), compact disc-read-only memory (CD-ROM) or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., random access memory (RAM), read-only memory (ROM), a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for vehicle prediction, planning, and control, comprising:

recording, using a monocular camera of an ego vehicle, visual traffic signal state information at an intersection, visual turn light and/or brake light state information of surrounding autonomous dynamic objects (ADOs), and traffic state information of the ego vehicle;

separately encoding the visual traffic signal state information, the visual turn light and/or brake light state information, and the traffic state information into corresponding traffic state latent spaces;

aggregating the corresponding traffic state latent spaces to form a generalized traffic geometry latent space;

interpreting the generalized traffic geometry latent space to form a traffic flow map including current and future vehicle trajectories;

decoding the generalized traffic geometry latent space to predict a vehicle behavior according to the traffic flow map based on the current and future vehicle trajectories; and controlling the ego vehicle to follow a planned trajectory at the intersection in response to the predicted vehicle behavior and the current and future vehicle trajectories based on the traffic flow map without relying on map data or light detection and ranging (LIDAR) or radio detection and ranging (RADAR) sensors.

2. The method of claim 1, in which separately encoding comprises:

encoding visual traffic signal state information at the intersection into a traffic signal state latent space of the corresponding traffic state latent spaces;

encoding turn light and/or brake light state information of surrounding autonomous dynamic objects (ADOs) into a turn/brake light signal state latent space of the corresponding traffic state latent spaces; and encoding traffic state information of an ego vehicle into an ego state latent space of the corresponding traffic state latent spaces.

3. The method of claim 1, in which aggregating the corresponding traffic state latent spaces comprises:

predicting a future traffic signal state according to a traffic light latent space of the corresponding traffic state latent spaces; and predicting a vehicle state according to the future traffic signal state and a turn/brake light state latent space of the corresponding traffic state latent spaces.

4. The method of claim 1, further comprising training a neural network to predict the vehicle behavior of a vehicle at the intersection using a traffic signal prediction as an input.

5. The method of claim 1, in which generating the traffic flow map comprises:

aggregating vision inputs of traffic light signals at the intersection during operation of an ego vehicle;

predicting a future state of the traffic light signals at the intersection during operation of the ego vehicle;

processing turn/brake light signals of surrounding autonomous dynamic objects (ADOs) into a turn/brake light state latent space of the corresponding latent spaces;

predicting ADO vehicle behavior at the intersection according to the future state of the traffic light signals and the turn/brake light state latent space; and generating the traffic flow map according to an observed ADO vehicle behavior and the predicted ADO vehicle behavior at the intersection.

6. The method of claim 1, further comprising:

decoding the generalized traffic geometry latent space; and predicting an intention of a vehicle at the intersection.

7. The method of claim 1, further comprising:

decoding the generalized traffic geometry latent space; and forecasting a trajectory of a vehicle at the intersection.

8. The method of claim 1, further comprising planning the planned trajectory of the ego vehicle approaching the intersection according to the vehicle behavior and the traffic flow map based on the current and future vehicle trajectories.

9. A non-transitory computer-readable medium having program code recorded thereon for vehicle prediction, planning, and control, the program code being executed by a processor and comprising:

program code to record, using a monocular camera of an ego vehicle, visual traffic signal state information at an intersection, visual turn light and/or brake light state information of surrounding autonomous dynamic objects (ADOs), and traffic state information of an ego vehicle;

program code to separately encode the visual traffic signal state information, the visual turn light and/or brake light state information, and the traffic state information into corresponding traffic state latent spaces;

program code to aggregate the corresponding traffic state latent spaces to form a generalized traffic geometry latent space;

program code to interpret the generalized traffic geometry latent space to form a traffic flow map including current and future vehicle trajectories;

program code to decode the generalized traffic geometry latent space to predict a vehicle behavior according to the traffic flow map based on the current and future vehicle trajectories; and program code to control the ego vehicle to follow a planned trajectory at the intersection in response to the predicted vehicle behavior and the current and future vehicle trajectories based on the traffic flow map without relying on map data or light detection and ranging (LIDAR) or radio detection and ranging (RADAR) sensors.

10. The non-transitory computer-readable medium of claim 9, in which the program code to separately encode comprises:

program code to encode visual traffic signal state information at the intersection into a traffic signal state latent space of the corresponding traffic state latent spaces;

program code to encode turn light and/or brake light state information of surrounding autonomous dynamic objects (ADOs) into a turn/brake light signal state latent space of the corresponding traffic state latent spaces; and program code to encode traffic state information of the ego vehicle into an ego state latent space of the corresponding traffic state latent spaces.

11. The non-transitory computer-readable medium of claim 9, in which the program code to aggregate the corresponding traffic state latent spaces comprises:

program code to predict a future traffic signal state according to a traffic light latent space of the corresponding traffic state latent spaces; and program code to predict a vehicle state according to the future traffic signal state and a turn/brake light state latent space of the corresponding traffic state latent spaces.

12. The non-transitory computer-readable medium of claim 9, further comprising program code to train a neural network to predict the vehicle behavior of a vehicle at the intersection using a traffic signal prediction as an input.

13. The non-transitory computer-readable medium of claim 9, in which generating the traffic flow map comprises:

program code to aggregate vision inputs of traffic light signals at the intersection during operation of the ego vehicle;

program code to predict a future state of the traffic light signals at the intersection during operation of the ego vehicle;

program code to process turn/brake light signals of surrounding autonomous dynamic objects (ADOs) into a turn/brake light state latent space of the corresponding latent spaces;

program code to predict ADO vehicle behavior at the intersection according to the future state of the traffic light signals and the turn/brake light state latent space; and program code to generate the traffic flow map according to an observed ADO vehicle behavior and the predicted ADO vehicle behavior at the intersection.

14. The non-transitory computer-readable medium of claim 9, further comprising:

program code to decode the generalized traffic geometry latent space; and program code to predict an intention of a vehicle at the intersection.

15. The non-transitory computer-readable medium of claim 9, further comprising:

program code to decode the generalized traffic geometry latent space; and program code to forecast a trajectory of a vehicle at the intersection.

16. The non-transitory computer-readable medium of claim 9, further comprising program code to plan the planned trajectory of the ego vehicle approaching the intersection according to the vehicle behavior and the traffic flow map based on the current and future vehicle trajectories.

17. A system for vehicle prediction, planning, and control, the system comprising:

a traffic state latent space model to record, using a monocular camera of an ego vehicle, visual traffic signal state information at an intersection, visual turn light and/or brake light state information of surrounding autonomous dynamic objects (ADOs), and traffic state information of the ego vehicle, and to separately encode the visual traffic signal state information, the visual turn light and/or brake light state information, and the traffic state information into corresponding traffic state latent spaces;

a traffic geometry latent space model to aggregate the corresponding traffic state latent spaces to form a generalized traffic geometry latent space;

a semantic traffic flow generation model to interpret the generalized traffic geometry latent space to form a traffic flow map including current and future vehicle trajectories;

a vehicle behavior prediction model to decode the generalized traffic geometry latent space to predict a vehicle behavior according to the traffic flow map based on the current and future vehicle trajectories; and a controller module to control the ego vehicle to follow a planned trajectory at the intersection in response to the predicted vehicle behavior and the current and future vehicle trajectories based on the traffic flow map without relying on map data or light detection and ranging (LIDAR) or radio detection and ranging (RADAR) sensors.

18. The system of claim 17, in which the vehicle behavior prediction model is further to decode the generalized traffic geometry latent space, and program code to predict an intention of a vehicle at the intersection.

19. The system of claim 17, in which the vehicle behavior prediction model is further to decode the generalized traffic geometry latent space, and to forecast a trajectory of a vehicle at the intersection.

20. The system of claim 17, further comprising a planner module to plan the planned trajectory of the ego vehicle approaching the intersection according to the vehicle behavior and the traffic flow map based on the current and future vehicle trajectories.

* * * * *